(12) United States Patent
Mancini

(10) Patent No.: US 8,696,970 B2
(45) Date of Patent: Apr. 15, 2014

(54) PROCESS FOR PRODUCING PNEUMATIC TYRES

(75) Inventor: Gianni Mancini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1025 days.

(21) Appl. No.: 12/309,114

(22) PCT Filed: Jul. 11, 2006

(86) PCT No.: PCT/IT2006/000528
§ 371 (c)(1),
(2), (4) Date: Oct. 9, 2009

(87) PCT Pub. No.: WO2008/007398
PCT Pub. Date: Jan. 17, 2008

(65) Prior Publication Data
US 2010/0038016 A1 Feb. 18, 2010

(51) Int. Cl.
*B29C 35/02* (2006.01)
*B29D 30/08* (2006.01)

(52) U.S. Cl.
USPC ............ 264/326; 156/135; 425/36; 425/38

(58) Field of Classification Search
USPC ............... 264/315, 326, 501; 156/132, 135; 425/36, 38
See application file for complete search history.

(56) References Cited

U.S. PATENT DOCUMENTS

| | | | |
|---|---|---|---|
| 1,526,594 A * | 2/1925 | Gammeter et al. ........... | 156/135 |
| 1,528,659 A | 3/1925 | De Mattia | |
| 2,625,981 A | 1/1953 | Wallace | |
| 2,645,265 A * | 7/1953 | O'Neil .......................... | 156/135 |
| 5,034,079 A * | 7/1991 | Rach et al. ..................... | 156/135 |
| 5,853,526 A | 12/1998 | Laurent et al. | |
| 2004/0094252 A1* | 5/2004 | Galimberti et al. ........... | 152/510 |

FOREIGN PATENT DOCUMENTS

| | | | |
|---|---|---|---|
| EP | 0 604 984 A1 | 7/1994 | |
| GB | 1 542 132 | 3/1979 | |
| GB | 1 542 133 | 3/1979 | |
| GB | 2 185 211 A | 7/1987 | |
| GB | 2185211 * | 7/1987 | ............ B29D 30/08 |
| WO | WO-01/00395 A1 | 1/2001 | |
| WO | WO-2004/045837 A1 | 6/2004 | |
| WO | WO-2005/042237 A1 | 5/2005 | |
| WO | WO-2005/053942 A1 | 6/2005 | |
| WO | WO-2006/033119 A1 | 3/2006 | |

* cited by examiner

*Primary Examiner* — James Mackey
(74) *Attorney, Agent, or Firm* — Finnegan, Henderson, Farabow, Garrett & Dunner, L.L.P.

(57) ABSTRACT

Along a building line, a green tyre is built on a rigid toroidal support having an outer surface substantially conforming in shape to an inner surface of the green tyre. The green tyre is then transferred to a bead moulding and prevulcanisation station where each bead of the tyre is moulded by tightening it between a surface portion of the toroidal support and an annular clamping surface carried by a removable tightening flange. The tightened beads are prevulcanised through a heat supply by means of electric resistors integrated into the tightening flanges. The tyre with the prevulcanised and tightened beads is transferred into a moulding cavity having an inner wall of a shape substantially conforming to that of the outer surface of the moulded tyre, to carry out moulding of the tyre and complete vulcanisation of same.

14 Claims, 5 Drawing Sheets

PROCESS FOR PRODUCING PNEUMATIC TYRES

CROSS REFERENCE TO RELATED APPLICATION

This application is a national phase application based on PCT/IT2006/000528, filed Jul. 11, 2006, the content of which is incorporated herein by reference.

BACKGROUND OF THE INVENTION

1. Field of the Invention

The present invention relates to a process and an apparatus for producing pneumatic tyres.

2. Description of the Related Art

A tyre for vehicle wheels generally comprises a carcass structure including at least one carcass ply having respectively opposite end flaps in engagement with respective annular anchoring structures integrated into the regions usually identified as "beads".

Associated with the carcass structure is a belt structure comprising one or more belt layers located in radially superposed relationship with respect to each other and to the carcass ply and having textile or metallic reinforcing cords with a crossed orientation and/or substantially parallel to the circumferential extension direction of the tyre. A tread band is applied to the belt structure at a radially external position, which tread band too is made of elastomeric material, like the other semifinished products constituting the tyre.

It is to be pointed out herein that, to the aims of the present description, by the term "elastomeric material" it is intended a compound comprising at least one elastomeric polymer and at least one reinforcing filler. Preferably, this compound further comprises additives such as cross-linking agents and/or plasticizers, for example. Due to the presence of the cross-linking agents, this material can be cross-linked by heating, so as to form the final manufactured product.

Respective sidewalls of elastomeric material are also applied to the side surfaces of the carcass structure, each extending from one of the side edges of the tread band until close to the respective annular anchoring structure to the beads. In tyres of the tubeless type, an air-tight coating layer usually referred to as "liner", covers the inner tyre surfaces.

Generally, manufacture of tyres for vehicle wheels contemplates, after building of the green tyre through assembling of the respective components, a moulding and vulcanising treatment to be carried out for the purpose of determining the structural stabilisation of the tyre through cross-linking of the elastomeric compounds and forming a desired tread pattern thereon as well as printing possible distinctive graphic signs at the tyre sidewalls.

Producing processes are known in which building of the green tyre is carried out through manufacture of the different components thereof by laying series of basic components on a sufficiently rigid toroidal support the conformation of which matches the inner conformation of the finished tyre, which basic components consist of rubber-coated cords, strip-like elements of rubber-coated cords, and/or elongated elements of elastomeric material wound up around the toroidal support through a so-called "spiralling" operation to form circumferential coils disposed in mutual side by side relationship. To the aims of the moulding and vulcanising treatment, the green tyre together with the toroidal support on which said tyre has been built, is enclosed into the moulding cavity of a vulcanisation mould the shape of which matches the outer configuration to be given to the finished tyre.

Generally, in vulcanisation processes the steam under pressure admitted into the toroidal support determines supply of part of the necessary heat for carrying out vulcanisation. Another part of the necessary heat is usually supplied through the mould from the outside of the tyre, suitably heated by means of channels provided in the vulcanisation apparatus, through which steam or other heating fluid runs.

WO-01/00395 in the name of the same Applicant discloses a process of the above mentioned type involving use of a toroidal support of an outer diameter slightly smaller than the inner diameter of the finished tyre. After the tyre built on the toroidal support has been enclosed into the vulcanisation mould, it is pressed against the holding walls of the moulding cavity while steam under pressure is admitted into the toroidal support. The crown region of the tyre is moulded against the inner surface of the moulding cavity following a radial expansion induced by steam under pressure that will fill a diffusion interspace defined between the toroidal support and the inner surface of the tyre itself.

U.S. Pat. No. 5,853,526 discloses a building process in which the tyre components are formed on an expandable toroidal support including a reinforced bladder the inner end flaps of which are sealingly fastened to mutually coaxial anchoring flanges integral with two half-shafts telescopically in engagement with each other. The reinforced bladder inflated to a predetermined pressure, keeps a predefined geometric structure corresponding to the inner conformation of the tyre to be built, so that it lends itself to support the components of the tyre being processed. When building has been completed, the tyre is enclosed into the vulcanisation mould together with the expandable toroidal support. The bladder will receive steam to determine pressing of the tyre against the inner surfaces of the moulding cavity and simultaneous heat supply to the tyre itself, for vulcanisation.

WO-2004/045837 in the name of the same Applicant as well, proposes carrying out of a preliminary heat supply to the tyre through feeding of a counterpressure fluid into the mould, externally of the tyre itself, to counteract pressure of the steam or other fluid fed to the inside of the toroidal support. Thus heat can be supplied to a sufficiently high temperature and for a period of time long enough to ensure correct consolidation or strengthening of the beads and sufficient cross-linking of the liner, before moulding of the tyre crown portion is carried out through admission of high-pressure steam into the diffusion interspace.

On practically carrying out the above processes, the Applicant has encountered different difficulties correlated with the tyre moulding and vulcanising treatment.

In particular, the Applicant could observe some difficulties for obtaining a constant quality of the product at the beads. In fact, even when particular attention is paid during the tyre building steps so as to manufacture the tyre components with precise shape and size tolerances, often structural faults are encountered at the beads at the end of the moulding and vulcanisation steps.

The Applicant has noticed that one of the possible causes for these faults is to be sought in the sudden unavoidable deformations imposed to the elastomeric tyre components during the step of closing the mould. In fact, it has been found that the individual components of the green tyre, above all those made through a spiralling operation, do not have a conformation exactly identical with that imposed by the mould to the finished product. On closure of the mould, the elastomeric material composing the tyre is forced to adapt itself in an almost instantaneous manner to the inner conformation of the mould, above all at the beads that are usually the first tyre regions coming into contact with the inner walls of the mould on closure. In addition, since the beads must have a high geometric and size precision, they are usually held between the inner mould walls and the toroidal support to be submitted to a moulding operation of the so-called "imposed-volume" type, in which migration of possible elastomeric excess material to the sides or other parts of the mould cavity is imposed.

The tyre is therefore submitted to sudden deformations transmitting anomalous and hardly controllable stresses to the different structural components of the beads, so that undesirable deformations can be caused.

The Applicant has therefore perceived that by blocking the geometry of the green tyre beads at the end of the building process and keeping this blocking during the moulding and vulcanisation steps, the above mentioned drawbacks can be overcome and a finished product can be obtained that is more in compliance with the design parameters.

SUMMARY OF THE INVENTION

In accordance with the present invention, the Applicant has therefore found that by keeping the beads tightened on the tyre-building toroidal support, from the end of building steps to the end of the tyre moulding and vulcanisation steps, and carrying out a previous bead moulding step before said tyre moulding and vulcanisation steps, important advantages can be achieved both in terms of simplification of the machinery and production processes and in terms of quality and performance of the finished product.

In particular, in accordance with a first aspect of the invention, it is proposed a process for producing pneumatic tyres, comprising the steps of:
  building a green tyre on a toroidal support, which green tyre has a pair of beads each defined along a respective inner circumferential edge of said tyre, said toroidal support having an outer surface the shape of which substantially matches that of an inner surface of the green tyre;
  moulding each bead by tightening it between a surface portion of the toroidal support and an annular clamping portion axially opposite to the surface portion of the toroidal support;
  transferring the tyre with the beads maintained in a tightened condition, into a moulding cavity, said moulding cavity having an inner wall substantially conforming to the shape of an outer surface of the moulded tyre;
  moulding and vulcanising the tyre.

Tightening of the beads between the clamping surfaces and the respective surface portions of the toroidal support, carried out before transferring the tyre into the mould, enables moulding of the beads to be carried out irrespective of the step of enclosing the tyre into the mould itself. Therefore the beads can be moulded following the most appropriate times and stresses for ensuring a suitable geometric and size adaptation of same to the design standards, without submitting the beads themselves to too many stresses with consequent risks of deformation and damages to the components. This advantageously makes it possible to adopt less severe working tolerances during the tyre building step, and to carry out closure of the vulcanisation mould within short periods of time, without any risk of damages to the tyre structure.

According to a preferred solution, the process comprises a step of at least partly vulcanising the beads, each bead being tightened between said surface portion of the toroidal support and the annular clamping surface.

According to a further preferred solution, said step of transferring the tyre into the moulding cavity is carried out with the beads at least partly vulcanised.

The Applicant has observed that by virtue of the preliminary steps of moulding and prevulcanising the beads, the subsequent moulding and/or vulcanisation steps can be carried out by enclosing the tyre into the mould during the time strictly required for obtaining a sufficient structural strengthening of the remaining parts of the tyre itself, without being necessary the same time as required in the known art for achieving a sufficient strengthening of the beads.

Furthermore, the final vulcanisation degree of the beads can be advantageously controlled without greatly affecting the cross-linking degree of the remaining parts of the tyre.

In addition, prevulcanisation of the beads advantageously gives rise to strengthening of the bead structure and of the connections with the cords of the carcass structure and other reinforcing components integrated into the beads. Consequently, the cords can be submitted to important pretensioning actions during the subsequent tyre moulding and vulcanisation steps, without any risk of the cords slipping off the beads or of other structural faults in the tyre.

Carrying out prevulcanisation of the beads concurrently with a moulding step on the same further enables achievement of a suitable geometric and structural accuracy of the beads themselves. Being the beads maintained tightened by means of the clamping surfaces also during the subsequent tyre moulding step, centring of the tyre within the mould is simplified and improved, and the risk of deforming or damaging the beads during the subsequent step of enclosing the tyre into the mould is eliminated.

According to a further aspect, the invention relates to an apparatus for producing pneumatic tyres, comprising:
  a building unit designed to form a green tyre on a toroidal support, which green tyre has a pair of beads each defined along a respective inner circumferential edge of said tyre, said toroidal support having an outer surface substantially conforming to the shape of an inner surface of the green tyre;
  bead moulding devices, to tighten each bead between a surface portion of the toroidal support and an annular clamping surface axially opposite to said surface portion of the toroidal support;
  a tyre moulding unit having a moulding cavity with an inner wall substantially conforming in shape to an outer surface of the moulded tyre;
  devices for vulcanising the tyre;
  actuating devices for transferring the tyre together with said toroidal support and said bead moulding devices into the moulding cavity.

Further features and advantages will become more apparent from the detailed description of a preferred but not exclusive embodiment of a process and an apparatus for producing pneumatic tyres in accordance with the present invention.

BRIEF DESCRIPTION OF THE DRAWINGS

This description will be set out hereinafter with reference to the accompanying drawings given by way of non-limiting example, in which.

DETAILED DESCRIPTION OF THE INVENTION

Figure 1:
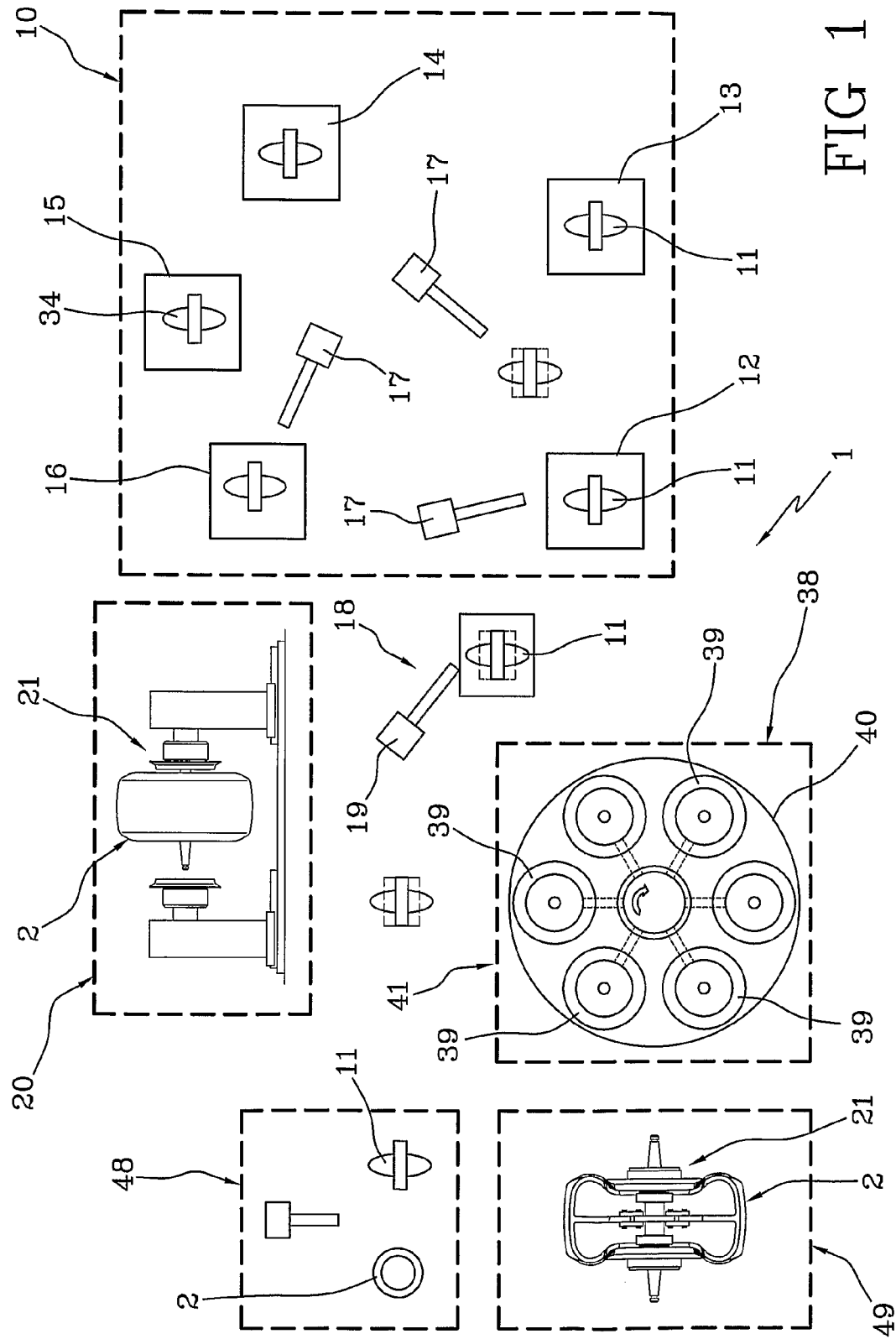
FIG. 1 is a diagrammatic top view of an apparatus for building tyres in accordance with the present invention.

Referring particularly to FIG. 1, an apparatus for producing pneumatic tyres for vehicle wheels provided for carrying out a process in accordance with the present invention has been generally identified with reference numeral 1.

Figure 2:
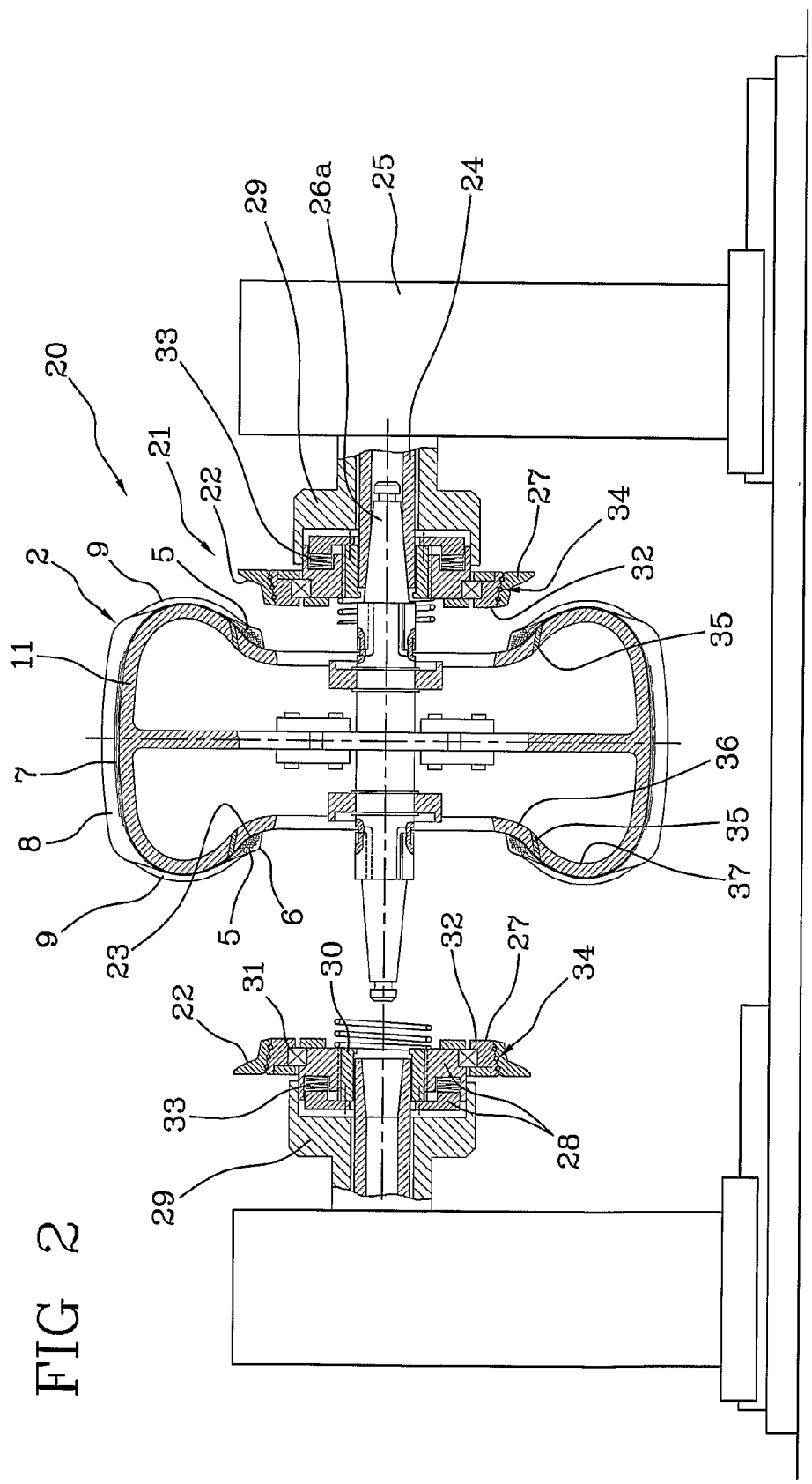
FIG. 2 diagrammatically shows a tyre in diametrical section during an engagement step in a moulding and prevulcanisation station of the beads.
Figure 3:
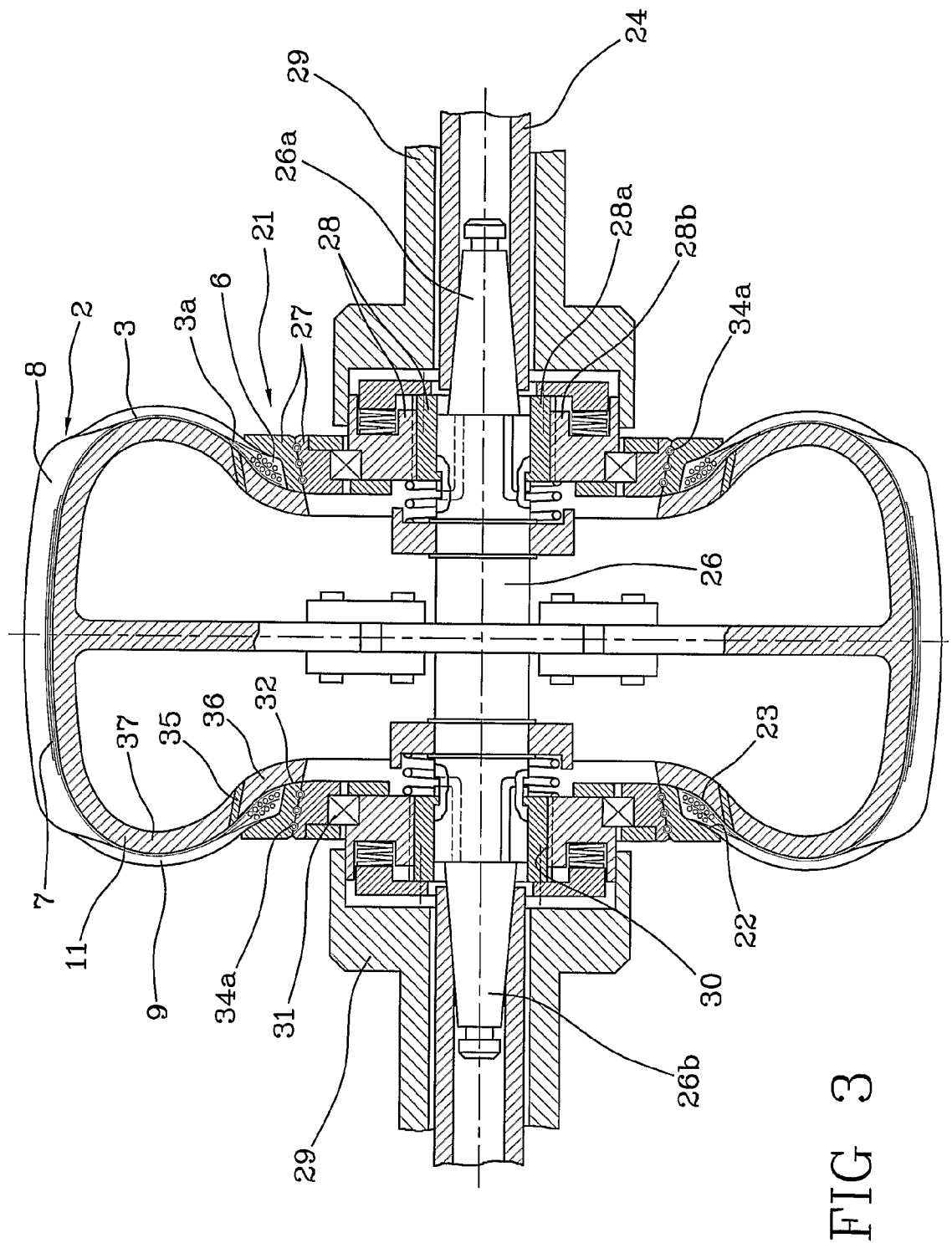
FIG. 3 shows the tyre during a step of moulding and vulcanising the beads.
Figure 4:
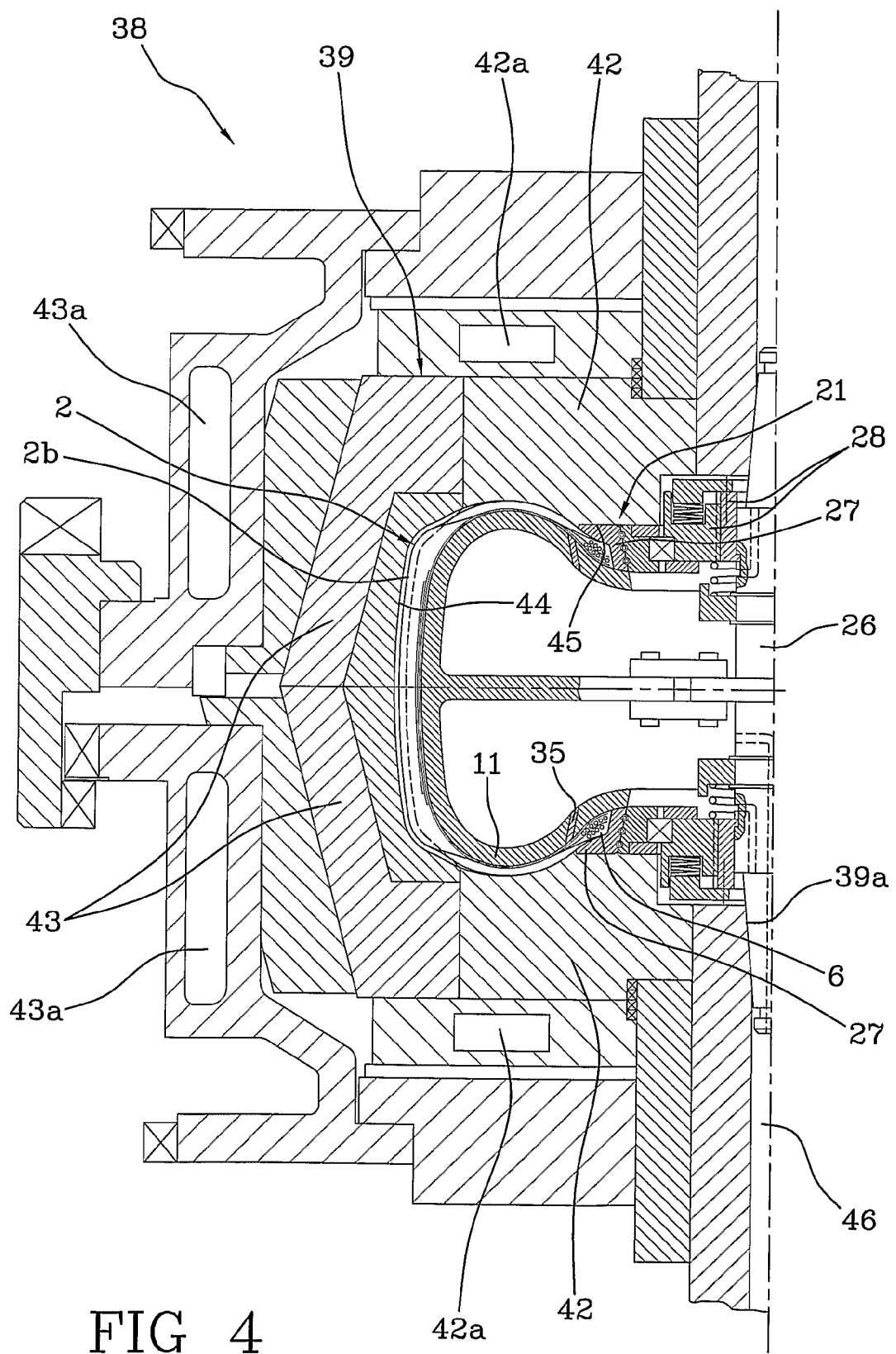
FIG. 4 diagrammatically shows the tyre seen in diametrical section and introduced into a vulcanisation mould.
Figure 5:
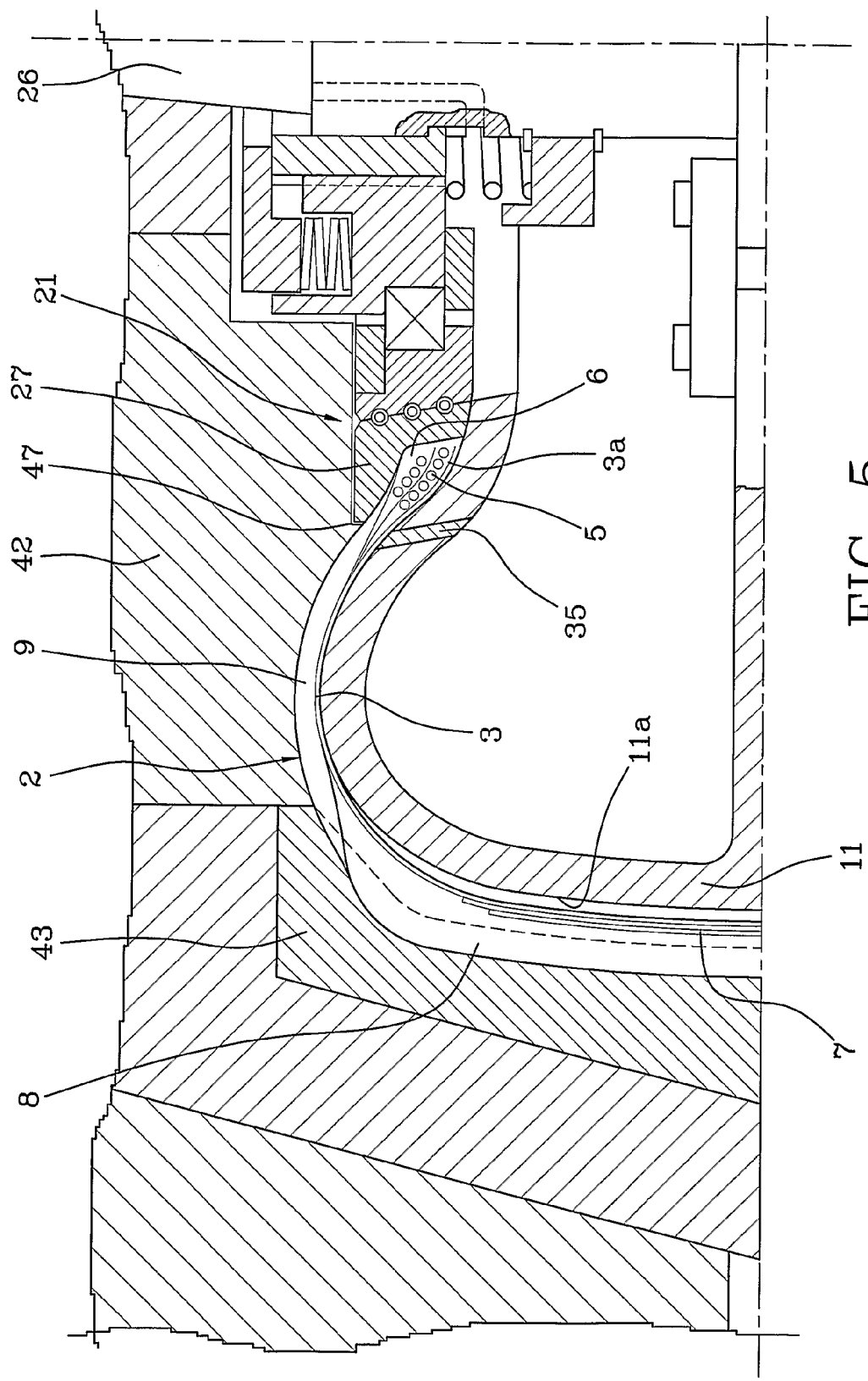
FIG. 5 shows the tyre seen in FIG. 4 during the vulcanisation step.

Apparatus 1 is intended for producing tyres 2 (FIGS. 2, 3) essentially comprising at least one carcass ply 3 internally coated with an airtight layer of elastomeric material or a so-called "liner" (not shown in the figures), two annular anchoring structures 5 in engagement with end flaps 3a of the carcass ply or plies close to respective regions usually referred to as beads 6, a belt structure 7 circumferentially applied around the carcass ply 3, a tread band 8 circumferentially overlapping the belt structure 7 and two sidewalls 9 applied to the carcass ply 3 at laterally opposite positions and each extending from the corresponding bead 6 to the corresponding side edge of the tread band 8.

Apparatus 1 essentially comprises at least one building line 10 integrating one or more building stations 12, 13, 14, 15, 16 or other devices adapted to form the tyre 2 with the carcass ply or plies 3 having the respective end flaps 3a in engagement with the annular anchoring structures 5. In the embodiment shown, each building station 12, 13, 14, 15, 16 is designed to form at least one component of the tyre 2 under processing, directly on a dismountable rigid toroidal support 11, made up of aluminium for example or other metal material, and having an outer surface 11a substantially conforming in shape to the inner surface of the green tyre 2 when building has been completed.

Alternatively, an expandable toroidal support can be employed, of the type described in document WO 2006/033119 for example, in the name of the same Applicant.

In more detail, by way of example, a first station 12 may be provided in which manufacture of the liner occurs through winding of a continuous elongated element of elastomeric material into coils disposed mutually in side by side relationship and distributed along the outer surface 11a of the toroidal support 11. In at least one second building station 13 manufacture of the carcass ply or plies 3 can be carried out, through laying of strip-like elements in a circumferentially approached relationship on the toroidal support 11, which strip-like elements are formed from a continuous strip of elastomeric material comprising textile or metallic cords disposed parallel in side by side relationship. A third building station 14 can be dedicated to manufacture of the annular anchoring structures 5 integrated into the beads 6 of tyre 2, through laying of at least one continuous elongated element comprising at least one rubberised metallic cord, in the form of radially, superposed coils. At least one fourth building station 15 can be dedicated to manufacture of the annular belt structure 7 obtained by laying in a circumferentially approached relationship, strip-like elements formed from a continuous strip of elastomeric material comprising preferably metallic, mutually parallel cords, and/or through winding up into axially approached coils, of at least one rubberised, preferably metallic reinforcing cord in the crown portion of tyre 2. At least one fifth building station 16 can be provided for making the tread band 8 and sidewalls 9. Tread band 8 and sidewalls 9 are preferably obtained through winding of at least one continuous elongated element of elastomeric material into mutually approached coils. The building stations 12, 13, 14, 15, 16 distributed along the building line 10 can each simultaneously operate on a respective tyre 2 under processing, carried by a respective toroidal support 11, sequentially transferred from a building station to a next one, by means of robotized arms 17 or other suitable devices.

When building has been completed, the tyre 2 comes close to a transfer station 18 interlocked with a robotized arm or other suitable transfer device 19 adapted to engage the green tyre on the building line 10 and transfer it to a bead moulding and prevulcanisation station, generally denoted at 20, in which the beads 6 are moulded and preferably at least partly prevulcanised separately from the remaining parts of tyre 2 that are substantially maintained to a green state.

For the purpose, the bead moulding and prevulcanisation station 20 comprises bead moulding devices 21 designed to tighten each bead 6 between at least one annular clamping surface 22 axially external to the bead itself, and a surface portion 23 of the toroidal support 11, axially internal to the bead. In more detail, the bead moulding devices 21 may comprise a support member 24, a chuck for example, borne by a base 25 and suitable to be operatively coupled to a first end 26a of a grip spigot 26 coaxially carried by the toroidal support 11. The toroidal support 11 carrying the green built tyre 2 therefore lends itself to be engaged by the robotized transfer arm 19 at a second end 26b of the grip spigot 26 to be picked up from the building line 10 and transferred to the bead moulding and prevulcanisation station 20. To this aim, the robotized arm introduces the first end 26a of the grip spigot 26 into the support member 24 and leaves the toroidal support 11 that stays in the moulding and prevulcanisation station 20 being supported in overhanging by the support member itself.

The moulding devices further comprise a pair of tightening flanges 27 for coaxial engagement at laterally opposite positions with the toroidal support 11. Each tightening flange 27 carries one of the annular clamping surfaces 22 lending itself to cooperate with a respective surface portion 23 of the toroidal support 11 localised along a radially internal circumferential portion of the toroidal support itself, to cause tightening and consequent moulding of the respective bead 6 by adapting the latter to the geometric conformation of the mutually-coupled clamping surface 22 and surface portion 23.

Each tightening flange 27 is operatively carried by a hub 28 to be removably engaged by a grasp member 29 coaxially movable relative to the toroidal support 11 sustained by the support member 24. After the robotized transfer arm 19 has engaged the toroidal support 11 on the support member 24, the grasp members 29 move the tightening flanges 27 close to the toroidal support 11 itself, on axially opposite sides, until said flanges are urged against the respective beads 6 of tyre 2.

By bayonet joints 30 or other suitable engagement devices operating between the grip spigot 26 of the toroidal support 11 and each hub 28, the tightening flanges 27 become steadily engaged with respect to the toroidal support 11. When engagement has occurred, the grasp members 29 can release the hubs 28 and move away from the respective tightening flanges 27.

If needed, rolling bearings 31 can be operatively interposed between each tightening flange 27 and the respective hub 28 to enable angular rotation of the latter for operation of the bayonet joints 30 without causing the radially external part of the flange itself to be driven in rotation, so as to prevent the clamping surfaces 22 from undesirably sliding on the raw elastomeric material forming the beads 6.

In addition or alternatively, the grasp members 29 can be utilised to exert an axial thrust action of the flanges 27 towards the toroidal support 11 and keep it for a desired period of time, so as to promote moulding of the beads 6 by means of the clamping surfaces 22 against the action of the surface portions 23.

Each tightening flange 27 is provided, at an axially internal position, with an abutment shoulder 32 designed to act against an inner circumferential edge of the toroidal support 11 to stop approaching of the clamping surface 22 to a predetermined distance from the corresponding surface portion 23 carried by the toroidal support 11 itself.

Thus, moulding of the beads 6 by adopting the so-called "imposed-volume" procedure can be carried out.

In addition or as an alternative to the abutment shoulders 32, the clamping surface 22 can be urged, through spring elements 33, towards the respective surface portions 23 with a predetermined tightening load during moulding of the beads 6, to enable moulding of same with an "imposed load", i.e. according to a predetermined clamping pressure. In the example shown, the spring elements 33 for each tightening flange 27 comprise Belleville washers operatively interposed between a fixed portion 28a of the hub 28, integral with the bayonet joint 30, and a movable portion 28b of the hub 28 itself, integral with the respective tightening flange 27 and axially slidable relative to the fixed portion 28a. The Belleville washers, on reaching of a predetermined preload, are submitted to yielding to enable closure of the bayonet joint 30 without imposing an excessive pressing to the beads 6 even when the latter, in the presence of excess material for example, should have a larger volume than that delimited by the mutually approached clamping surfaces 22 with the abutment shoulders 32 against the surface portions 23 of the toroidal support 11.

In addition, in the moulding and prevulcanisation station 20, prevulcanisation devices 34 operate, which essentially comprise localised heating members 34a of the tyre 2 in the region close to the beads 6. In more detail, these localised heating members 34a can be at least partly integrated into the bead moulding devices 21, by means of electric resistors incorporated into the tightening flanges 27, for example. In addition or alternatively, electric resistors can be also integrated into the toroidal support 11, close to the surface portions 23. After the beads 6 have been tightened between the clamping surfaces 22 and the respective surface portions 23, the electric resistors 34a lend themselves to be activated, by means of electric connectors for example, not shown and carried by said grasp members 29, over a predetermined period of time adapted to obtain a desired cross-linking degree in the elastomeric material of which the beads 6 of tyre 2 are made.

To hinder an undesirable vulcanisation of parts of the tyre 2 other than the beads 6, at least one heat insulator 35 can be operatively interposed between the tyre 2 and, the toroidal support 11, or at least the parts of the toroidal support in contact with the beads 6. This heat insulator may comprise at least one pair of inserts of heat insulating material for example, that are each operatively interposed between a radially internal portion 36 of the toroidal support 11 delimiting the surface portion 23 and a radially external portion 37 of the toroidal support itself.

Thus heat conduction is inhibited from the radially internal portion 36 to the radially external portion 37 of the toroidal support 11 and, consequently, to the parts of tyre 2 in contact with said radially external portion 37.

When the moulding and prevulcanisation step of the beads 6 has been completed, actuating devices embodied by said robotized transfer arm 19 for example, pick up the toroidal support 11 with the green tyre 2 engaged thereon from the bead moulding and prevulcanisation station 20 to transfer them to a moulding unit 38. This transfer step can be advantageously carried out without removing the tightening flanges 27 from the toroidal support 11, so that tyre 2 is transferred to the moulding unit 38 while the beads 6 are maintained in a tightened condition between the clamping surfaces 22 and surface portions 23.

In the embodiment shown in FIG. 1 the moulding unit 38 comprises a plurality of moulds 39 disposed in a rotatable structure 40 so as to be sequentially brought to a loading/unloading position 41 where removal of the vulcanised tyre 2 is carried out as well as the subsequent introduction of the green tyre 2 thereinto, on its coming from the bead moulding and prevulcanisation station 20.

Each mould 39 essentially has a pair of axially opposite plates 42 designed to operate on the sidewalls 9 of tyre 2, and a plurality of moulding sectors 43 designed to operate against the tread band 8 and defining, together with plates 42, a moulding cavity 44 having an inner wall the shape of which substantially matches the outer surface 2b of the tyre 2 when moulding is over.

Also defined in the moulding cavity 44 is at least one seat 45 for housing the bead moulding devices 21, more specifically for receiving the tightening flanges 27.

During introduction of tyre 2 into the mould 39, the centring spigot 26 carried by the toroidal support 11 lends itself to be introduced into at least one centring seat 39a provided in the mould itself, so as to ensure centred positioning of tyre 2 within the mould.

Closure of mould 39 takes place by axial approaching of the axially opposite plates 42 and simultaneous radial approaching of the moulding sectors 43.

When closure has been completed, the sidewalls 9 of tyre 2 are tightened between the plates 42 and the toroidal support 11, while the beads 6 remain clamped between the tightening flanges 27 and the radially internal portions 36 of the toroidal support itself.

Preferably, the moulding cavity 44 has slightly greater diametrical sizes than the diametrical sizes of the green tyre 2. Consequently, when the mould 39 has been fully closed, the inner wall of the moulding cavity 44 is slightly spaced part from the radially external portion of tyre 2.

When the mould 39 is closed, completion of the vulcanisation step on tyre 2 is started. For the purpose, a vulcanisation fluid under pressure, such as steam, nitrogen or a mixture thereof for example, or any other suitable fluid, preferably steam and nitrogen, is fed into the toroidal support 11 through a feeding duct 46 opening into the mould 39, internally relative to the toroidal support 11.

The feeding pressure of the vulcanisation fluid forces the tyre 2 to radial expansion until the radially external part thereof is brought to adhere against the inner wall of the moulding cavity 44. The radial expansion of tyre 2 imposes stretching of same, particularly as regards the belt structure 7 and the cords forming the carcass ply or plies 3. Advantageously, the tightening action exerted on the beads 6 by the clamping surfaces 22 and the corresponding surface portions 23, preferably concurrently with an at least partial prevulcanisation of the beads 6, efficiently retains the cords of the carcass ply or plies 3 at the region of the annular anchoring structures 5. Therefore, the risk that a stretching action induced on the cords of the carcass ply or plies 3 by effect of the radial expansion of tyre 2 should involve sliding of the cords relative to the annular anchoring structure 5 is eliminated.

The vulcanisation fluid under pressure fed into the moulding cavity 44, as well as into other suitable channels 42a, 43a provided close to the plates 42 and/or the sectors 43 of mould 39, transmits heat to the tyre 2 in the amount required for cross-linking of the latter.

At least one thermal-cutting gap 47, possibly filled with insulating material, can be defined between each of the tightening flanges 27 and the moulding cavity 44, to limit heat transmission to the beads 6 already partly or fully cross-linked during the prior prevulcanisation step.

When cross-linking of tyre 2 has been completed, or has reached a sufficient degree to ensure a desired geometric and structural stability of same, the mould 39 can be opened to enable tyre 2 to be removed and transferred, upon the action of a robotized arm or other suitable devices, to a dismantling station 48 where devices not shown carry out removal of the bead moulding devices 21 through disassembling of the tightening flanges 27 from the toroidal support 11, as well as removal of the toroidal support 11 itself from the vulcanised tyre 2.

If required, transfer of the tyre to the dismantling station 48 can be preceded by a pause step during which the tyre itself stays in a post-vulcanisation station 49 to a controlled temperature. The bead moulding devices 21 can be advantageously maintained in engagement relationship on the tyre beads 6 during the post-vulcanisation step, so as to further ensure an optimal geometric and size stability of the beads themselves. In particular, folding the beads 6 under tightened conditions during the post-vulcanisation step enables engagement of the end flaps 3a of the carcass ply or plies relative to the annular reinforcing structures 5 to be maintained until complete structural stabilisation of the elastomeric material so as to avoid occurrence of undesirable slipping off or structural deformations. It is therefore possible, in case of need, to reduce the residence time of tyre 2 within the mould 39, which is advantageous for productivity, without any risk of impairing the structural stability and integrity of the tyre itself.

The invention claimed is:

1. A process for producing pneumatic tyres, comprising:
    building a green tyre on a toroidal support, said green tyre having a pair of beads each defined along a respective inner circumferential edge of said tyre, said toroidal support having an outer surface the shape of which substantially matches that of an inner surface of the green tyre;
    moulding each bead by tightening the bead between a surface portion of the toroidal support and an annular clamping surface axially opposite to the surface portion of the toroidal support;
    transferring the tyre with the beads maintained to a tightened condition, into a moulding cavity, said moulding cavity having an inner wall substantially conforming in shape to an outer surface of the tyre; and
    moulding and vulcanizing the tyre,
    wherein an at least partial vulcanization of each bead is achieved while said bead is tightened between said surface portion of the toroidal support and said annular clamping surface and before transferring the tyre into the moulding cavity,
    whereby transferring the tyre into the moulding cavity is carried out with the beads at least partially vulcanized.

2. The process as claimed in claim 1, wherein the building step comprises manufacturing at least one carcass ply having end flaps in engagement with respective annular reinforcing structures integrated into each of the beads of the tyre.

3. The process as claimed in claim 1, wherein at least one structural component of the tyre is directly formed on the toroidal support during said building step.

4. The process as claimed in claim 1, further comprising a step of transferring the green tyre from a building line to a bead moulding and prevulcanisation station.

5. The process as claimed in claim 1, wherein during moulding of the beads, the toroidal support is supported in a cantilever fashion at a grip spigot coaxially carried by the toroidal support.

6. The process as claimed in claim 1, said at least partial vulcanization of the beads is carried out by localised heating of the tyre at the beads.

7. The process as claimed in claim 1, wherein the tyre is heat insulated relative to the toroidal support at least during said at least partial vulcanization of the beads.

8. The process as claimed in claim 1, wherein the annular clamping surfaces are provided on respective tightening flanges susceptible of coaxial engagement with the toroidal support at laterally opposite positions.

9. The process as claimed in claim 1, wherein the annular clamping surfaces and the corresponding surface portions of the toroidal support are spring urged against each other with a predetermined tightening load during moulding of the beads.

10. The process as claimed in claim 1, wherein the annular clamping surfaces and the corresponding surface portions of the toroidal support are locked to a predetermined mutual distance during moulding of the beads.

11. The process as claimed in claim 1, wherein at least part of the tyre vulcanisation is carried out simultaneously with the tyre moulding step.

12. The process as claimed in claim 1, wherein a step of stretching the tyre is carried out simultaneously with the tyre moulding and vulcanisation steps.

13. The process as claimed in claim 12, wherein tensioning of cords being part of a carcass ply is achieved by effect of the stretching step.

14. The process as claimed in claim 1, further comprising the step of removing the tyre from the moulding cavity and transferring the tyre with the beads maintained in a tightened condition, to a post-vulcanisation station kept at a controlled temperature.

* * * * *